United States Patent [19]

Davis

[11] 4,343,699

[45] Aug. 10, 1982

[54] CONVERTIBLE DUAL CONTAINER STORAGE SYSTEM

[75] Inventor: Stephen H. Davis, Dayton, Ohio

[73] Assignee: Water Refining Company, Inc., Middletown, Ohio

[21] Appl. No.: 150,865

[22] Filed: May 19, 1980

Related U.S. Application Data

[63] Continuation of Ser. No. 21,738, Mar. 19, 1979, abandoned.

[51] Int. Cl.³ .............................................. B01D 29/38
[52] U.S. Cl. ................................... 210/190; 210/191; 210/277
[58] Field of Search .................. 220/69, 408, 413, 425, 220/431, 466, 468, 469; 210/190, 191, 277, 278, 282

[56] References Cited

U.S. PATENT DOCUMENTS

| | | |
|---|---|---|
| 2,996,213 | 8/1961 | Mitchell et al. ................ 220/411 X |
| 3,352,419 | 11/1967 | Entringer et al. ............. 210/277 X |
| 3,465,880 | 9/1969 | Lyall .............................. 210/190 X |
| 3,838,789 | 10/1974 | Cvacho ................................ 220/69 |

Primary Examiner—S. Leon Bashore, Jr.
Assistant Examiner—Ferris H. Lander
Attorney, Agent, or Firm—Biebel, French & Nauman

[57] ABSTRACT

A dual tank storage system is provided having a first generally cylindrical upstanding tank adapted to be positioned either adjacent to or within a second tank of larger diameter. The tanks are in fluid connection and are useful in systems requiring the segregated storage of two fluids until the fluids are mixed and used or in systems where a stored fluid is required periodically to regenerate the contents of another container. A cover is also provided which fits completely over the first tank, when the first tank is positioned within the second tank, and forms a seal with the upper rim of the second tank.

5 Claims, 3 Drawing Figures

U.S. Patent  Aug. 10, 1982  4,343,699
FIG-1
FIG-2
FIG-3
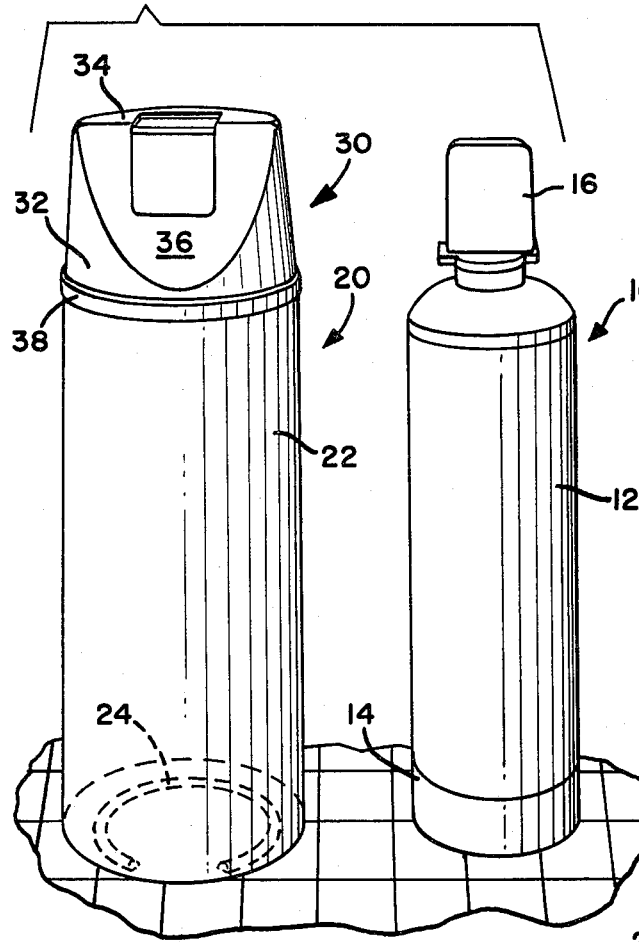
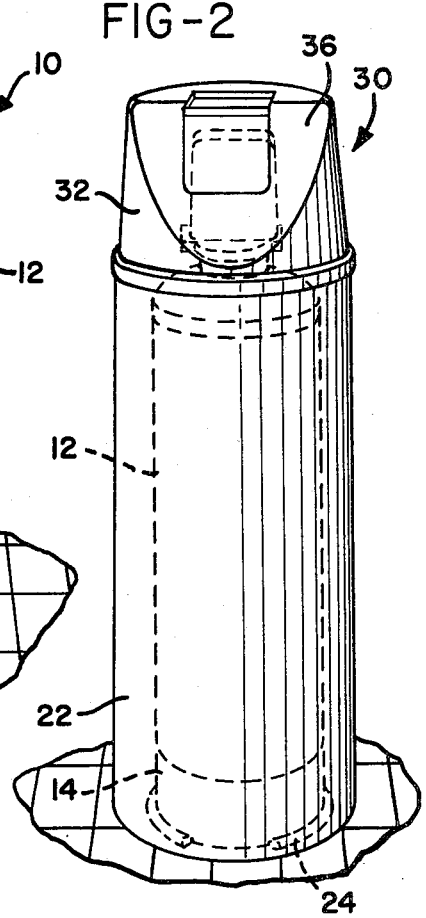
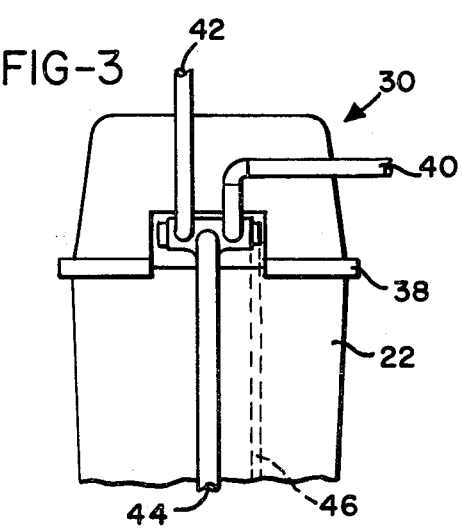

CONVERTIBLE DUAL CONTAINER STORAGE SYSTEM

This is a continuation of application Ser. No. 021,738 filed Mar. 19, 1979 and now abandoned.

BACKGROUND OF THE INVENTION

The present invention relates to convertible dual container systems, and more particularly to systems where a fluid stored in one container is periodically required for use in a second container.

Dual container systems may find use in a wide variety of applications. For example, in systems requiring the segregated storage of two liquids for a period of time before mixing, blending, etc., a dual container system is a necessity. Additionally, some systems may require a second liquid periodically to regenerate the contents of a container through which a first process liquid has been flowing. These systems may include beds of ion exchange resins or filter media which periodically become exhausted. A particular application of dual container systems is in the field of domestic water softening.

Household water softeners utilizing ion exchange typically include a resin tank, through which hard water is passed and exchange of "hard" ions of calcium and magnesium for "soft" sodium ions takes place, and a brine tank. After a period of operation the ion exchange resin in the resin tank needs to be regenerated to remove accumulated hardness ions and to replenish softness ions. This is accomplished by passing a salt solution from the brine tank through the resin bed.

The regeneration cycle typically lasts about an hour and needs to be done, on the average, about every other day. More frequent regenerations are required during periods of heavy water usage. With each regeneration cycle, a new charge of brine solution is required. Typically, household water softening systems have provided for storage of dry salt pellets above the level of brine solution in the brine tank sufficient for providing brine solution for relatively long periods of time.

Prior art household water softening systems have been constructed either with the brine and resin tanks in a side-by-side relationship or with the resin tank fitted within the brine tank. Typical of the side-by-side structure is Rose, U.S. Pat. No. Re. 25,979. This type of structure permits maximum storage capacity for salt and eliminates the need for frequently refilling the brine tank with salt. However, the side-by-side structure requires a relatively large amount of floor space which may not always be available in smaller homes or apartments.

Placing the resin tank within the brine tank as shown by Miller, U.S. Pat. No. 3,285,418, and Prior et al., U.S. Pat. No. 3,891,552, conserves floor space, but greatly reduces the volume of usable salt storage space within the brine tank and necessitates frequent refilling thereof with salt. Additionally, neither the prior art side-by-side tanks nor the resin tank within brine tank systems were adapted to convert from one configuration to the other if the need arose, such as for example, if the water conditioning system was moved to a different location. Moreover, distributors of domestic water softening systems had to stock both separate types of systems because convertibility from one to the other was not possible.

Accordingly, the need exists in the art for a dual container system which is easily convertible to either a side-by-side or tank within a tank configuration as the need arises and which, because of its adaptability, can be installed in a wide variety of locations.

SUMMARY OF THE INVENTION

In accordance with the present invention a convertible dual container system is provided having first and second tanks and a cover adapted to span the two when one is disposed within the other. The first tank is a vertically upstanding, generally cylindrical tank having a timer and multivalve assembly associated therewith. The bottom of the first tank is of a flat, planar configuration such that the tank is freestanding without the need for any external supporting structure. The second tank is also of a generally cylindrical construction, but is designed to have a diameter greater than the diameter of the first tank. The second tank is also freestanding. The base of the second tank has a circular ridge upstanding therefrom into which the base of the first tank is adapted to fit. The ridge aids in the proper positioning of the first tank within the second tank when a tank-in-tank configuration is used.

The cover for the second tank is of a hollow, cylindrical configuration adapted to sealingly engage the upper rim of the second tank. The cover has a tapered, upstanding wall spanned by a flat lid portion. A front portion of the wall of the cover is cut off at an angle to the horizontal less than the remaining portions of the wall, forming a flat face upon which visual indicia may be printed. The height of the cover is such that when the first tank is positioned in the second tank, there is sufficient clearance for the cover to fit over the first tank and sealingly engage the upper rim portion of the second tank. The rear wall portion of the cover is provided with an opening which accommodates piping associated with the system.

The relative sizes of the individual components and the freestanding nature of both the first and second tanks permits adaptability of the system to either a side-by-side configuration or a tank within a tank configuration. In this manner, a single dual container system can be adapted for uses which require a minimum of floor space or uses which require a maximum liquid storage capacity.

In a preferred embodiment of this invention, the first tank will contain a bed of ion exchange resin material and the second tank will contain a supply of a regenerating brine solution. In operation, raw water will be treated by passing it through the resin bed in the first tank. Periodically, brine solution is flowed from the second tank through the resin bed to regenerate it.

Accordingly, it is an object of this invention to provide a dual container system which is adaptable to meet a variety of space and storage requirements; it is a further object of this invention to provide a freestanding tank which is adapted to fit inside of a larger diameter tank; it is yet another object of this invention to provide a tank cover adapted to be able to fit over an upstanding tank disposed within a second tank and sealingly engage the upper rim portion of the second tank. These and other objects and advantages of the invention will become apparent from the following description, the accompanying drawings, and the appended claims.

BRIEF DESCRIPTION OF THE DRAWINGS

FIG. 1 is a front elevation of the first and second tanks of the present invention in a side-by-side configuration;

FIG. 2 is a front elevation of the tanks of the present invention in a tank-in-tank configuration, with the first tank being shown in broken lines; and FIG. 3 is a view of the rear of the system of FIG. 2.

DESCRIPTION OF THE PREFERRED EMBODIMENTS

As shown in FIG. 1, the dual container system of the present invention may be set up to operate in a side-by-side configuration. In a preferred embodiment, cylindrical tank 10 may contain ion exchange resin material to effect water softening. The resin is distributed throughout vertical section 12 of the tank and, for a typical domestic water softener, will contain 1.0 cubic foot or some portion thereof of resin. The resin may be any known ion exchange resin used in the art to soften water.

Tank 10 has a flat bottom which is encased in sleeve 14 which snugly fits thereon. Sleeve 14 may be made of a rigid polymeric material or metal and has a generally cylindrical shape, closed at one end. Tank 10 may be fabricated of steel coated inside and out with a polymeric material to resist corrosion. Use of a steel tank permits operation of the tank at pressures up to 125 psi. At the top of tank 10 a timer and valve assembly 16 is attached thereto. All of the piping for the system is connected to valve assembly 16 including a raw water inlet, conditioned water outlet, and drain. The valve assembly also controls and directs the flow of liquid between the two tanks. In the preferred embodiment, valve assembly 16, is a five cycle flow control valve as taught by Rose, U.S. Pat. No. 3,080,975, herein incorporated by reference.

Storage tank 20 has a diameter larger than tank 10 and is also of a generally cylindrical shape having a vertical section 22. Storage tank 20 may be constructed either of metal or a rigid polymeric material; the tank should be resistant to corrosion from the materials stored therein. In the base of tank 20, there is provided a circular upstanding ridge of material 24 sized to have a diameter slightly larger than the diameter of tank 10. The ridge may be molded into the base of tank 20 concurrent with the formation of the tank or may be secured in the tank during a later assembly operation. In this manner, when tank 10 is disposed in tank 20, ridge 24 encircles the base of tank 10, properly positioning it within tank 20. Means (not shown) are provided to remove liquid from tank 20 and pass it through valve assembly 16 into tank 10.

Storage tank 20 is provided with a cover 30 which has a tapered, upstanding wall 32 which is spanned by lid 34. Optionally, the cover may have a flat, angular portion 36 forming the front face of cover 30 and which may have visual indicia thereon relating to the operation of the system. The bottom edge 38 of cover 30 forms a collar which is adapted to sealingly engage the upper rim of tank 20. Cover 30 may be fabricated of the same materials as tank 20. The combined height of tank 20 and cover 30 is such that tank 10 will fit within tank 20 and still permit cover 30 to sealingly engage the upper rim of tank 20.

As shown in FIG. 3, the back of cover 30 has an opening therein to receive the required piping for the system when it is in a tank-in-tank configuration. Liquid inlet 40, treated liquid outlet 42, and drain 44 are connected through valve assembly 16 to tank 10. A draw tube 46, positioned to have an opening at the bottom of tank 20, is in fluid connection with tank 10 through the valve assembly.

In operation in its preferred embodiment as a water softening system, tank 10 will contain an ion exchange resin and tank 20 will contain a regenerating brine solution. Raw water will enter tank 10 through inlet 40 and valve assembly 16 and into the top of the tank. As the water passes down through the resin bed it is softened and passes into an outlet distributor at the bottom of the tank and then to outlet 42. After the resin bed is exhausted, the direction of water flow through the resin bed is reversed to backwash the system, with water exiting from drain 44. Then, brine from tank 20 is cycled through inlet 40 into the resin bed in tank 10 to regenerate the resin. After regeneration, the brine is rinsed from tank 10, the tank refilled with raw water, and the softening cycle repeated.

Because of the design of the system, it is adaptable for many different needs requiring either maximum storage capacity of a liquid or a minimum of floor space. The design of the storage tank and cover to be adapted to completely enclose the first tank provides a convenient and attractive system for the user.

What is claimed is:

1. A convertible dual container storage system of the type wherein a fluid stored in one container is periodically required for use in the other container comprising:

a first vertically upstanding, generally cylindrical tank, said first tank having means located near the base thereof to maintain itself in a freestanding, upright position and adapted to be positioned next to or within a second larger tank and easily convertible from one such position to the other;

a second vertically upstanding, generally cylindrical tank having a diameter larger than said first tank and having a circular ridge extending upwardly from the base thereof adapted to partially surround and position said first tank in said second tank, said second tank being capable of storing the fluid which is periodically required for use in said first tank, said first and second tanks being in fluid connection with each other so that liquid may be removed from said second tank and passed into said first tank; and a hollow, generally cylindrical cover means having a tapered, upstanding wall portion spanned by a flat lid portion, and having an open end of slightly larger diameter than the upper rim portion of said second tank, whereby said open end of said cover means is adapted to sealingly engage said upper rim of said second tank, said upstanding wall portion of said cover means having sufficient height such that when said first tank is disposed within said second tank, said cover means fits over the top of said first tank and sealingly engages said upper rim of said second tank.

2. The storage system of claim 1 wherein said means to maintain said first tank in a freestanding, upright position comprises a cylindrical sleeve having an open end and a flat closed end, said sleeve adapted to fit over the bottom of said tank.

3. The storage system of claim 2 where said open end of said cover means has a collar, said collar engaging the upper rim of said second tank and providing frictional engagement of said cover means with said second tank.

4. The storage system of claim 3 where said first tank contains an ion exchange resin suitable for exchanging divalent metal cations in water for soft sodium cations.

5. The storage system of claim 4 where said second tank contains a brine solution for regenerating said ion exchange resin in said first tank.

* * * * *